Nov. 25, 1958
W. K. DOW
2,861,468
ACCELERATOR CONTROLLING DEVICE
Filed May 21, 1957
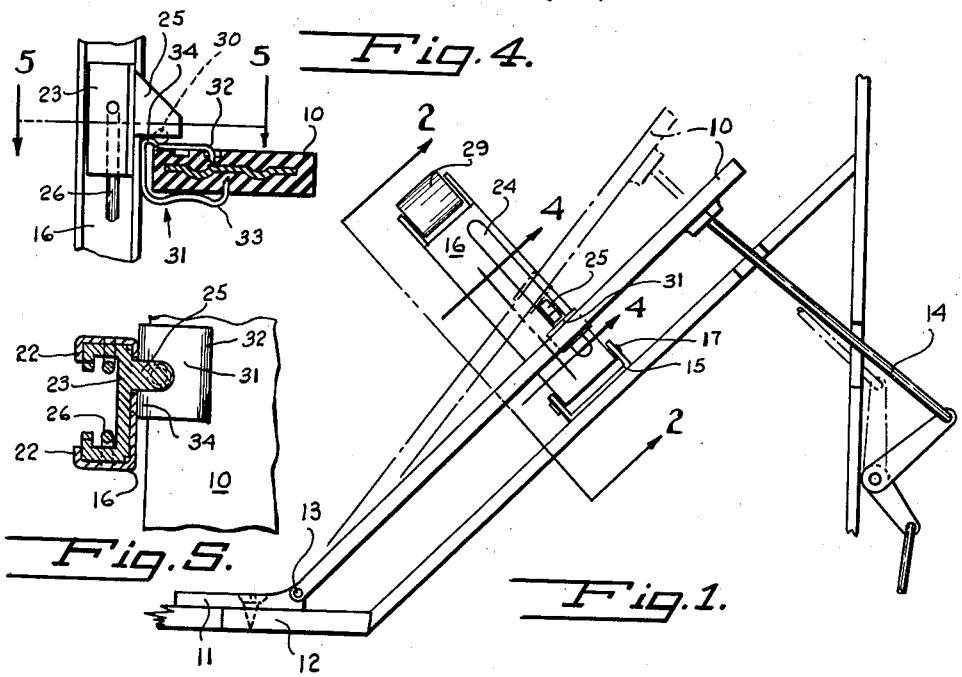
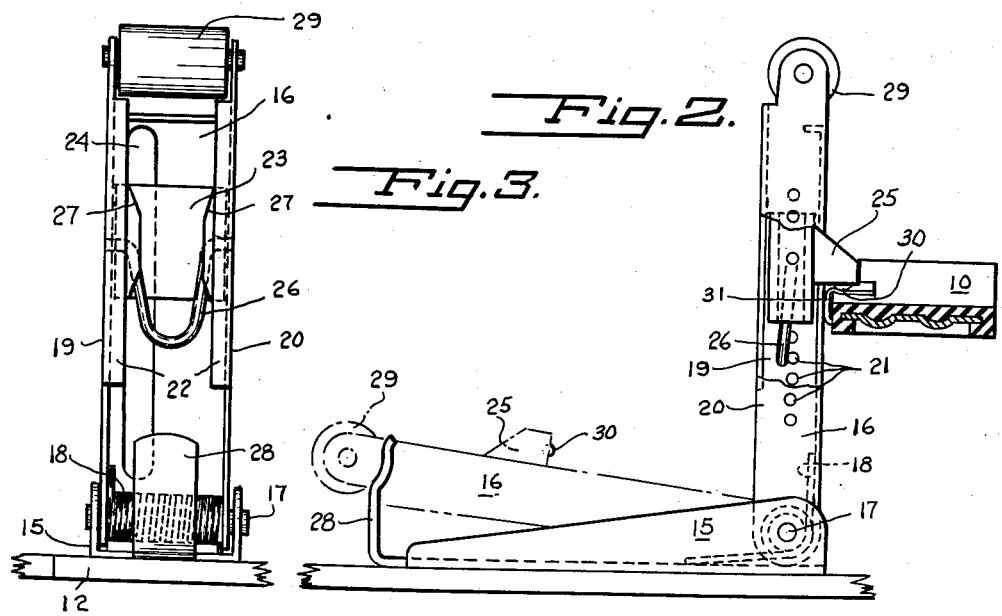
INVENTOR.
WALTER K. DOW
BY
Raymond A. Paquin
ATTORNEY.

United States Patent Office 2,861,468
Patented Nov. 25, 1958

2,861,468

ACCELERATOR CONTROLLING DEVICE

Walter K. Dow, Longmeadow, Mass.

Application May 21, 1957, Serial No. 660,705

4 Claims. (Cl. 74—513)

This invention relates to a new and improved device for retaining the accelerator of a vehicle in predetermined positon and thereby providing the vehicle with a fixed cruising speed without the necessity of the operator retaining his foot pressure on the accelerator pedal of the type set forth in my Patent 2,787,918.

An object of the invention is to provide a device of the type set forth wherein means is provided for retaining the accelerator pedal in adjusted position and predetermined setting regardless of movement of the accelerator pedal due to vibration or flimsy or loose construction thereof, and yet will allow the release of the accelerator pedal quickly and with little effort by the operator of the vehicle.

Another object of the invention is to provide a new and improved device of the type set forth which will not only improve the accelerator pedal retaining ability of the device but will also improve the useful life of both the accelerator pedal and the retaining device.

Another object of the invention is to provide a device of the type set forth with which both the engaging and disengaging of the retaining device and accelerator pedal is facilitated and can be accomplished with less effort on the part of the vehicle operator.

Another object is to provide improvements of the type set forth which are relatively simple and economical in construction, yet efficient in operation and which allows the simpler and less expensive manufacture of the device generally.

Other objects and advantages of the invention will be apparent from the following description taken in connection with the accompanying drawings. It will be understood that changes may be made in the details of construction and arrangement of parts without departing from the scope of the invention as set forth in the accompanying claims, as the preferred form of the invention has been set forth by way of illustration only.

Referring to the drawings:

Fig. 1 is a side view showing the device in operative position relative to a vehicle accelerator;

Fig. 2 is a sectional view taken on line 2—2 of Fig. 1, looking in the direction of the arrows;

Fig. 3 is a side view thereof taken from the side opposite that shown in Fig. 1;

Fig. 4 is a fragmentary sectional view taken on line 4—4 of Fig. 1, looking in the direction of the arrows; and Fig. 5 is a sectional view taken on line 5—5 of Fig. 4, looking in the direction of the arrows.

Referring more particularly to the drawings wherein similar reference characters designate corresponding parts throughout, the device shown is adapted for use in connection with a vehicle accelerator 10 which has the portion 11 connected to the floor 12 of the vehicle by screws or bolts or the like, and the accelerator pedal portion 10 is pivotally connected to the portion 11 by the pivot 13 and the accelerator pedal 10 is adapted to be depressed by the foot of the operator whereby the quantity of fuel supplied the engine is controlled through movement of control rod assembly 14.

As set forth in my Patent No. 2,787,918, referred to above, during the operation of the vehicle on the open road over long periods of time, the operator's foot and leg which must be maintained in a set position for such long periods of time, often becomes tired thereby causing discomfort to the operator, and with the present invention the necessity of the operator retaining his foot in such set position on the accelerator pedal for such long periods of time is eliminated, as the present device will retain the accelerator pedal in predetermined position whereby the speed of the engine will be maintained at predetermined cruising speed.

The apparatus for maintaining the accelerator pedal in such predetermined position comprises a base 15 which is adapted to be secured to the floor 12 of the vehicle by means of bolts or other securing means. The arm 16 is pivotally connected at 17 to base 15 and the pivot or hinge 17 is spring loaded by spring 18 which is wound on pivot 17 and has its opposite ends engaging base 15 and arm 16 and tending to urge arm 16 away from the base and toward the accelerator pedal 10.

The arm 16 is provided with oppositely disposed flanges 19 and 20 each of which is provided with a series of oppositely disposed openings 21 and flanges 19 and 20 are also provided with the inturned lips 22 for retaining the adjustable member 23 in position between flanges 19 and 20 while allowing adjustment thereof.

Longitudinal slot 24 is provided in arm 16 through which extends hook or catch 25 of adjustable member 23.

The top of the hook or catch 25 is angled downwardly so as to act as a cam slide as the foot comes into contact with the hook in pressing the accelerator pedal.

The lock spring 26 has its opposite ends projecting into oppositely disposed openings 21 for retaining the hook or catch 25 in adjusted position on arm 16 and the cam surfaces 27 on lips 22 facilitate the retraction of the ends of spring 26 from openings 21 for adjustment of the catch 25 on arms 16.

The locking portion 28 of the base 15 is faced upwardly from the base 15 and is adapted to be engaged by roller 29 to retain the device out of operating position, as shown in dotted lines in Fig. 2, and with the locking portion spaced from the base 15, the operator can press the edge of the sole of his shoe beneath the roller 29 for lifting the device out of locked position and the spring 18 will then urge arm 16 into upright position as shown in Fig. 2.

By pushing the arm 16 away from the accelerator pedal by engagement of the foot with the upper end of the arm 16 or roller 29, the device can be pushed into the position whereby the locking portion 28 engages roller 29 for locking the device out of operative position as previously described.

The catch 25 is provided with the projection member or portion in its lower side which is adapted to engage the accelerator pedal and which preferably consists of a hardened insert 30 which consists of a hardened ball bearing inserted in an opening in the lower surface of catch 25 and which, in addition to facilitating the engagement and disengagement of the catch with the accelerator pedal, also provides a wear resisting contact portion which allows the remainder of the catch to be made of a less expensive material with the wear resisting ball or insert forming a wear resistant contact portion of the catch.

The accelerator pedal 10 may also be provided with the wear resisting member or plate 31 having its opposite ends 32 and 33 pressed into the accelerator pedal for retaining the plate 31 in operative position.

Plate or member 31 is preferably formed with a raised or grooved portion 34 which is preferably rounded, as shown in Fig. 4, so that the ball 30 may easily ride over the engaging edge of the plate or member for quick and easy engagement or disengagement therewith.

As most accelerator pedals are made or coated with rubber or the like, the use of the wear resisting plate 31 provides an arrangement which may be easily and quickly attached to the conventional accelerator pedal and which provides an efficient contact portion for the pedal for engagement with the catch 25.

It will be seen that with the present arrangement, that the catch or hook will retain the accelerator pedal in its predetermined setting regardless of looseness or play or flimsy construction of the accelerator pedal and that the hook or catch will not be separated from the accelerator pedal due to vibration, and, furthermore, that in addition to improving the accelerator pedal retaining ability of the device the wear or useful life of both the accelerator pedal and the hook or catch member will be improved as well as providing positive retention of the accelerator pedal at its predetermined setting by the catch and in addition, due to the ball bearing action of the contact member 30 both engaging and disengaging of the catch with the accelerator is facilitated and will be accomplished quicker and with less effort on the part of the operator of the vehicle.

It will further be noted that with the hardened insert or contact member 30 that the hook or catch member 25 can be made of a softer material such as die casting for economy and simplicity and yet provide a device having a relatively long useful life due to the fact that the wear is absorbed by the insert or ball.

From the foregoing, it will be seen that I have provided new and improved means for obtaining all of the objects and advantages of the invention.

I claim:

1. In a device of the character described adapted to engage an accelerator pedal, a base adapted to be secured to the floor of a vehicle, an arm pivotally connected to said base, an adjustable member carried by said arm, means for locking said adjustable member in adjusted position on said arm, catch means carried by said adjustable member adapted to engage the accelerator pedal for retaining it in predetermined adjusted position, said catch means having a wear resisting contact portion for engaging the accelerator, said accelerator pedal having a retaining ridge for engaging said catch means, said wear resisting contact portion comprising a ball set in an overhanging portion of said catch means and adapted to engage said retaining ridge on said accelerator pedal.

2. In a device of the character described adapted to engage an accelerator pedal, a base adapted to be secured to the floor of a vehicle, an arm pivotally connected to said base, an adjustable member carried by said arm, means for locking said adjustable member in adjusted position on said arm, catch means carried by said adjustable member adapted to engage the accelerator pedal for retaining it in predetermined adjusted position, said catch means having a wear resisting contact portion for engaging the accelerator, said accelerator pedal having a retaining ridge for engaging said catch means, said wear resisting contact portion comprising a hardened insert extending from said catch means for engaging said retaining ridge on said accelerator pedal.

3. In a device of the character described adapted to engage an accelerator pedal, a base adapted to be secured to the floor of a vehicle, an arm pivotally connected to said base, an adjustable member carried by said arm, means for locking said adjustable member in adjusted position on said arm, catch means carried by said adjustable member adapted to engage the accelerator pedal for retaining it in predetermined adjusted position, said catch means having a wear resisting contact portion for engaging the accelerator, said accelerator pedal having a retaining ridge for engaging said catch means, said wear resisting contact portion comprising a steel bearing positioned in said catch.

4. In a device of the character described adapted to engage an accelerator pedal, a base adapted to be secured to the floor of a vehicle, an arm pivotally connected to said base, an adjustable member carried by said arm, means for locking said adjustable member in adjusted position on said arm, catch means carried by said adjustable member adapted to engage the accelerator pedal for retaining it in predetermined adjusted position, said catch means having a wear resisting contact portion for engaging the accelerator, and a wear plate on said accelerator pedal for engaging said wear resisting contact portion of said catch means, said accelerator pedal having a retaining ridge for engaging said catch means.

References Cited in the file of this patent

UNITED STATES PATENTS

| | | |
|---|---|---|
| 1,539,182 | Hackney | May 26, 1925 |
| 2,166,128 | Castle | July 18, 1939 |
| 2,312,031 | Coutcher | Feb. 23, 1943 |
| 2,787,918 | Dow | Apr. 9, 1957 |